(12) United States Patent
Sham et al.

(10) Patent No.: US 6,240,833 B1
(45) Date of Patent: Jun. 5, 2001

(54) AUTOMATIC FRENCH PRESS BEVERAGE MAKER

(76) Inventors: John C. K. Sham, The Redhill Peninsula, House No. 50, Cedar Drive, 18 Pak Pat Shan Rd. Aberdeen (HK); Kumkit Kunavongvorakul, 889 Thai C.C. Tower, 18th Floor, Rm 183 South Sathorn Road, Yannawa, Sathorn Bangkok (TH), 10120

( * ) Notice: Subject to any disclaimer, the term of this patent is extended or adjusted under 35 U.S.C. 154(b) by 0 days.

(21) Appl. No.: 09/366,818

(22) Filed: Aug. 4, 1999

(51) Int. Cl.[7] ........................................ A47J 31/00
(52) U.S. Cl. ........................ 99/297; 99/283; 99/287
(58) Field of Search .................. 99/297, 299, 287, 99/283; 426/433

(56) References Cited

U.S. PATENT DOCUMENTS

| | | |
|---|---|---|
| 204,099 | 5/1878 | Schmitz . |
| 1,053,735 | 2/1913 | Lefevre . |
| 1,346,485 | 7/1920 | Arrigunaga . |
| 1,552,565 | 9/1925 | Morton et al. . |
| 2,459,498 | 1/1949 | Cameron ........................ 99/287 |
| 2,604,031 | 7/1952 | Campbell ...................... 99/281 |
| 2,678,000 | 5/1954 | Scheidt et al. ............... 100/266 |
| 3,020,823 | 2/1962 | Musso ........................... 99/287 |
| 3,279,351 | 10/1966 | Cohn ............................. 99/282 |
| 3,371,591 | 3/1968 | Vandenburgh ................. 99/281 |
| 3,413,908 | * 12/1968 | Nadelson ........................ 99/297 |
| 3,935,318 | 1/1976 | Mihailide ...................... 426/80 |
| 4,121,508 | * 10/1978 | Hartkorn ....................... 99/283 |
| 4,882,983 | * 11/1989 | Pastrick ...................... 99/299 X |
| 5,027,696 | * 7/1991 | Antonini .................... 99/318 X |
| 5,237,911 | 8/1993 | Aebi ............................. 99/287 |
| 5,259,295 | 11/1993 | Timm ............................ 99/282 |
| 5,312,637 | 5/1994 | Midden ......................... 426/433 |
| 5,406,882 | 4/1995 | Shaanan ........................ 99/287 |
| 5,544,566 | 8/1996 | Bersten ......................... 99/287 |
| 5,635,233 | 6/1997 | Levinson ...................... 426/433 |
| 5,664,480 | 9/1997 | DiFilippo ..................... 99/299 |
| 5,809,867 | 9/1998 | Turner et al. ................ 99/297 |

FOREIGN PATENT DOCUMENTS

| | | | |
|---|---|---|---|
| 538794 | * 9/1932 | (DE) | ................................ 99/297 |
| 575278 | 4/1958 | (IT) | ................................ 99/297 |

* cited by examiner

*Primary Examiner*—Reginald L. Alexander
(74) *Attorney, Agent, or Firm*—Peter S. Canelias

(57) ABSTRACT

The invention relates to an improved automated beverage making machine combining a traditional French Press of the plunger/strainer type with an improved automatic hot water dispensing machine, the dispensing machine having a housing, a water tank and automatic electric water heater. The dispensing machine is adapted to communicate with a French Press plunger/strainer extractor where the extractor also functions as a serving carafe for hot infused beverages such as coffee and tea. The invention also employs improved heating circulation and temperature sensing system which recirculates water until the water has reached a pre-selected desired temperature.

7 Claims, 13 Drawing Sheets

AUTOMATIC FRENCH PRESS BEVERAGE MAKER

BACKGROUND OF THE INVENTION

1. Field of the Invention

The invention relates to an automated beverage making machine combining a traditional French Press of the plunger/strainer type with an improved automatic hot water dispensing machine, the dispensing machine having a housing, a water tank, automatic electric water heating means, and a means for receiving a French Press extractor where the extractor also functions as a serving carafe for hot infused beverages such as coffee and tea. Coffee and tea steeped with a traditional French Press provides the beverages with a particular flavor.

2. Description of the Prior Art

French Press beverage makers have been in use for many decades. Employing a French Press with the traditional hand-operated plunger/strainer extracts flavored beverage from a mixture of heated water and beverage making materials, such as ground coffee or tea. The traditional French Press has been in use, particularly in Northern Europe, since the $19^{th}$ century. To use such a device to prepare a beverage, it was necessary to employ an exterior and separate water heating or boiling apparatus to heat the water, and then pouring the heated water into the press for steeping, prior to using a plunger with a strainer or filter to extract the hot beverage from the press by separating the infused liquid from the beverage making material.

Automatic hot beverage machines have been in use in the prior art. None of these, however, have been combined with a French Press as in the present invention. One of the disadvantages of conventional hot beverage machines is that they do not provide hot water at a sufficiently high temperature so as to be optimal for use with a French Press plunger/strainer type of device. Extraction of flavor from beverage making materials using a plunger/strainer device requires water heated to a temperature higher than most prior art automatic beverage making machines. In addition, the hot beverage machines of the prior art are not adapted for use with a plunger/strainer type of apparatus functioning as the serving carafe.

SUMMARY OF THE INVENTION

It is therefore an object of this invention to provide an improved hot beverage maker combining a traditional French Press with an automatic hot water dispensing machine;

Another object of this invention is to provide hot water at a higher temperature so that sufficient flavor may be extracted using a traditional French Press;

Another object of this invention is to provide an improved water heating system which recirculates heated water until a desired, pre-selected temperature is reached;

Another object of this invention is to provide a drip proof valve which allows heated water to pass into a carafe only when the heated water has reached a pre-selected temperature;

Another object of this invention is to provide an improved beverage making machine where the machine is adapted to receive and cooperate with a carafe with a plunger/filter apparatus;

Another object of this invention is to provide alternative embodiments that permit adapting the invention to brew larger or smaller amounts of an infused beverage;

Another object of this invention is to provide an improved beverage making machine where the adapting of the machine to receive a plunger/filter carafe is especially attractive and easy to operate;

Another object of this invention is to provide an improved beverage making machine where the main body comprises two elliptical columns.

BRIEF DESCRIPTION OF THE DRAWINGS

The above-mentioned and other features and objects of this invention and the manner of obtaining them will become more apparent and the invention itself will be best understood by reference to the following description of the embodiments of the invention taken in conjunction with the accompanying drawings, wherein.

DETAILED DESCRIPTION OF THE PREFERRED EMBODIMENTS

First Preferred Embodiment

Figure 1:
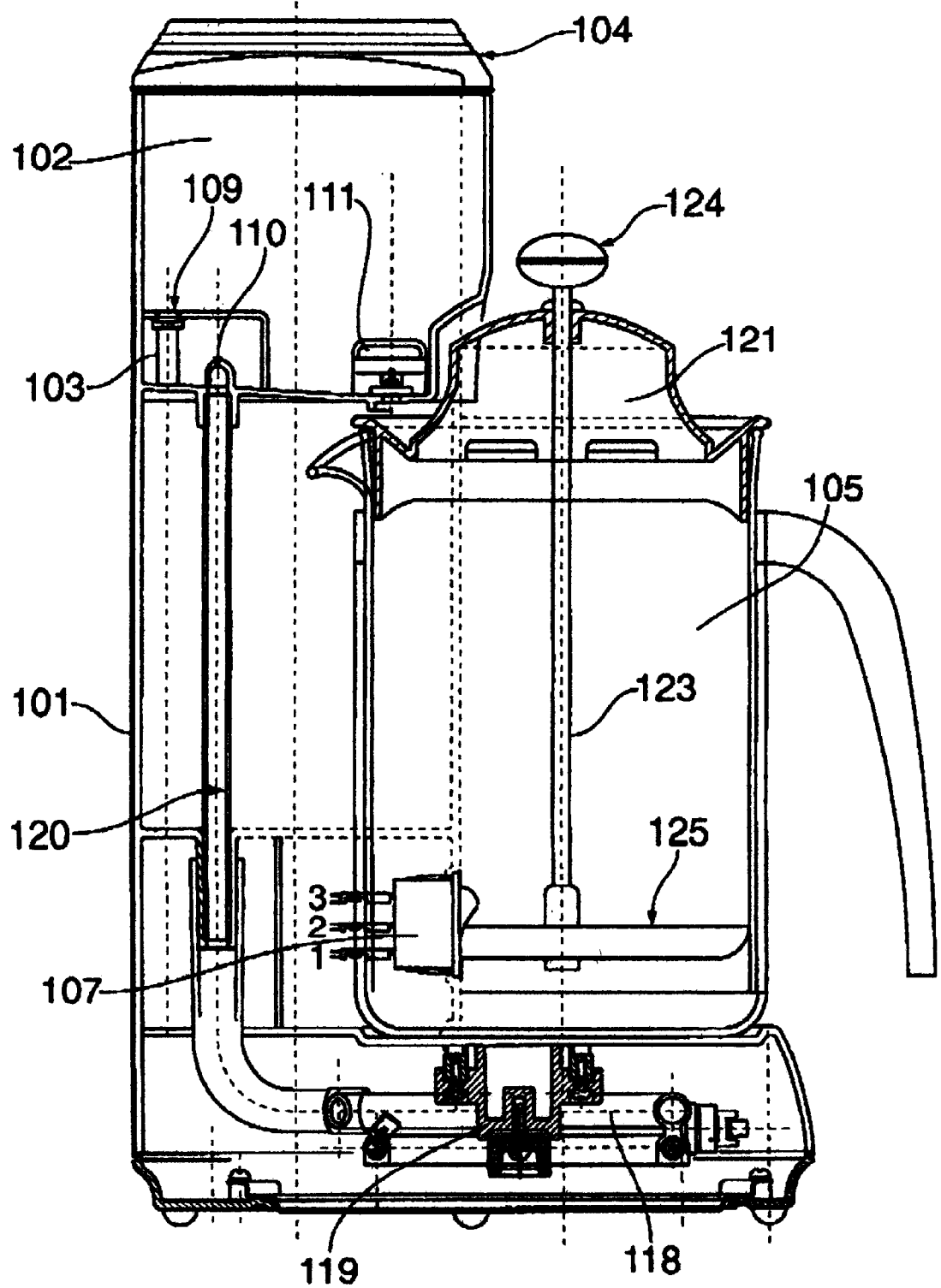
FIG. 1 is a side plan view of the first preferred embodiment of the invention.
Figure 2:
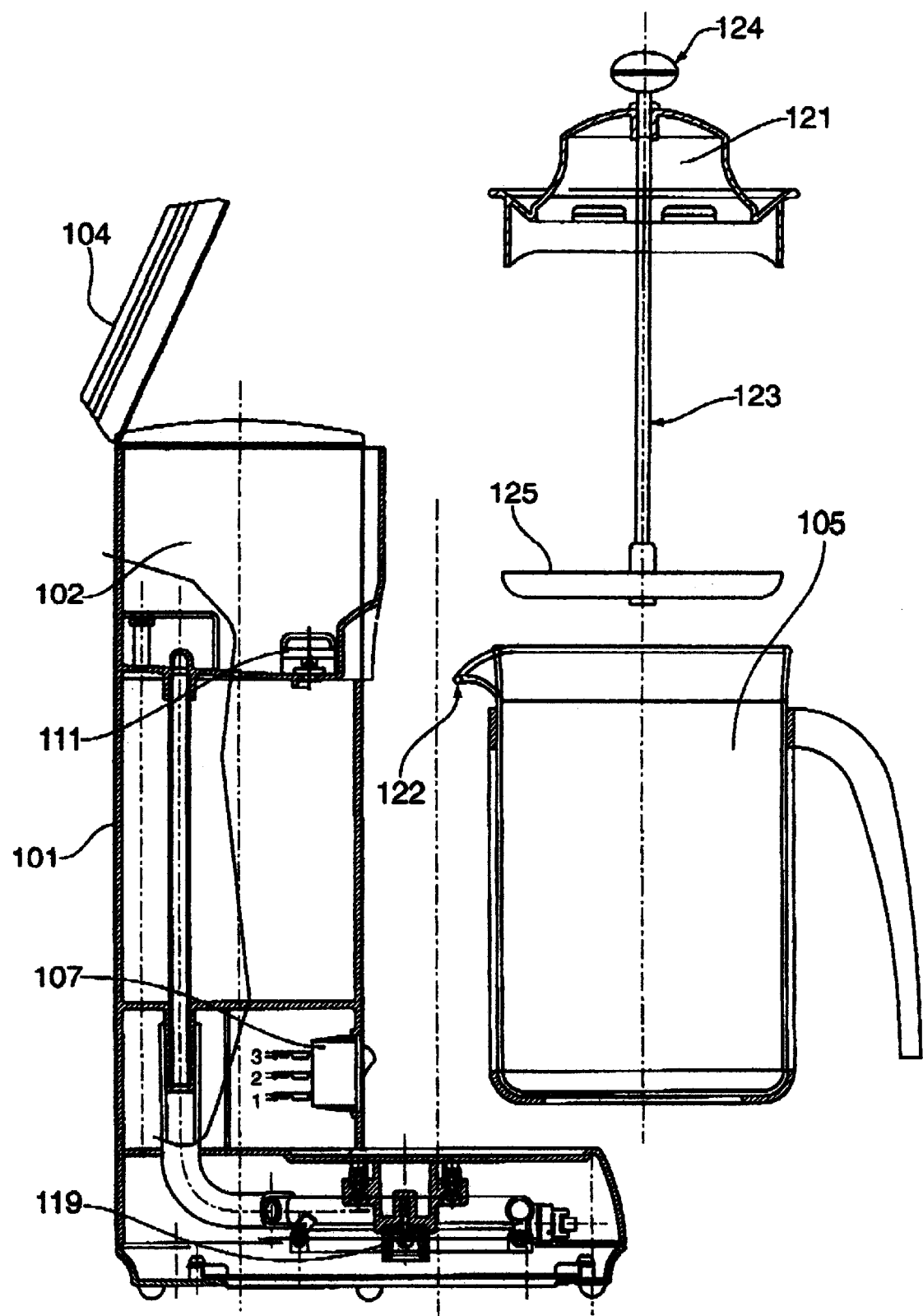
FIG. 2 is an exploded view of the first preferred embodiment of the invention.

Referring now to the drawings, FIGS. 1 and 2 illustrate a first preferred embodiment of the invention. This first embodiment is preferably adapted for brewing larger amounts of an infused beverage, for example, thirty-two to forty-eight fluid ounces of coffee or tea. FIG. 1 shows an improved beverage maker with a housing (101) having a water tank (102), which is connected to a water inlet tube (103). The water tank (102) is located in the upper portion of the housing (101). The water tank is divided into two receptacles, as more clearly shown in FIG. 3. The top portion of the housing (101) has a hinged lid (104) for protecting the water tank from contaminants. Both chambers of the water tank (102) are preferably symmetrical and also disposed on opposite sides of a beverage extraction/storage vessel, preferably in the form of a carafe (105). The carafe (105) is preferably formed of glass with thermal properties allowing for adequate expansion and contraction upon introduction of heated water. The water compartment chambers preferably are formed as elliptical columns that contribute to the attractive appearance of the machine. The hinged lid (104) covers the entire compartment (102), protecting it from contaminants when the hinged lid (104) is in the closed position.

The unit has an on/off switch (107) so that the unit may be turned on to initiate the water heating cycle, or off to end the water heating cycle. In addition, an automatic shut-off feature may be connected with the on/off switch so that the power can be shut off when there is no water in the water tank (102).

Figure 3:
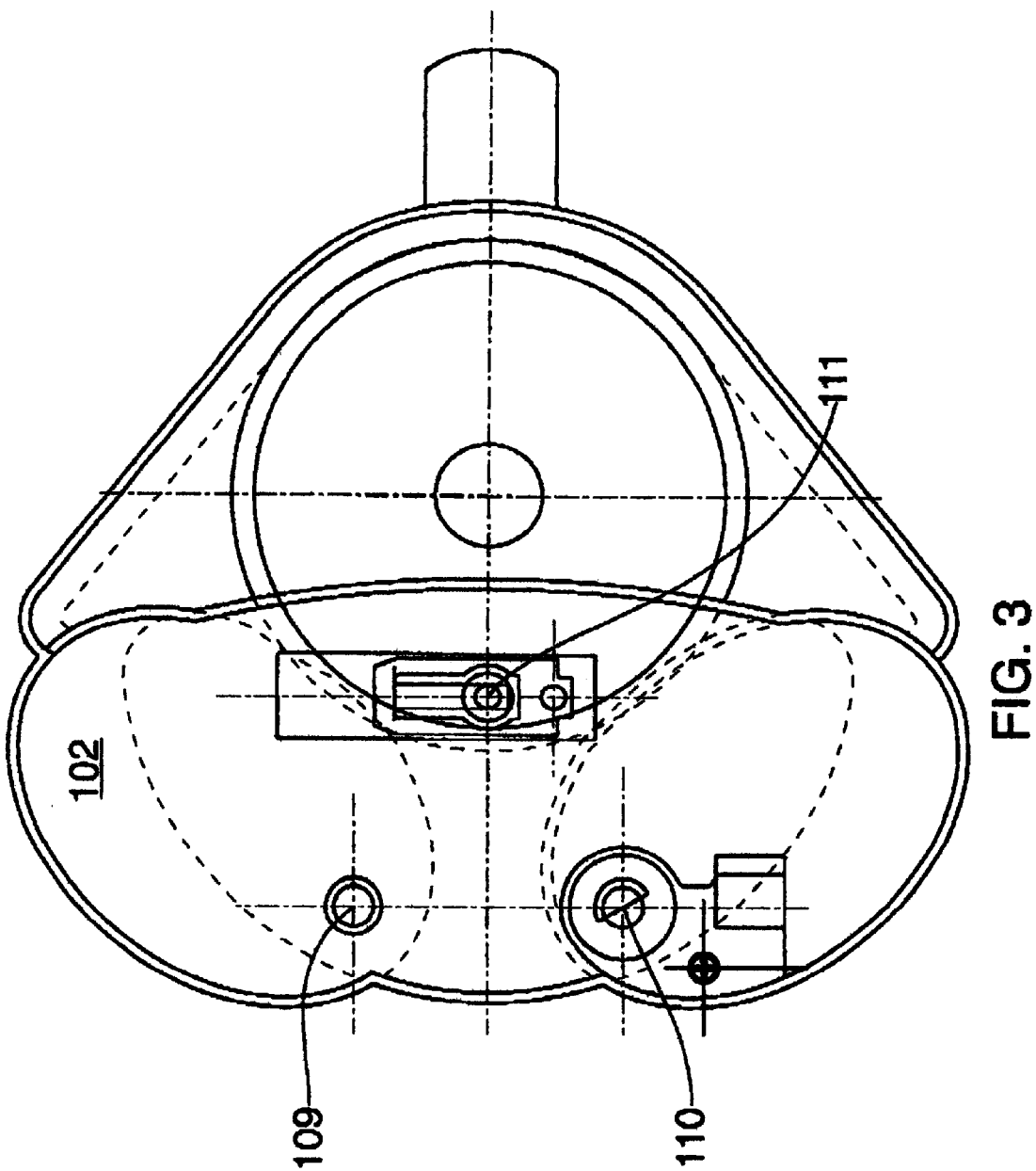
FIG. 3 is a top plan view of the first preferred embodiment of the invention.
Figure 4:
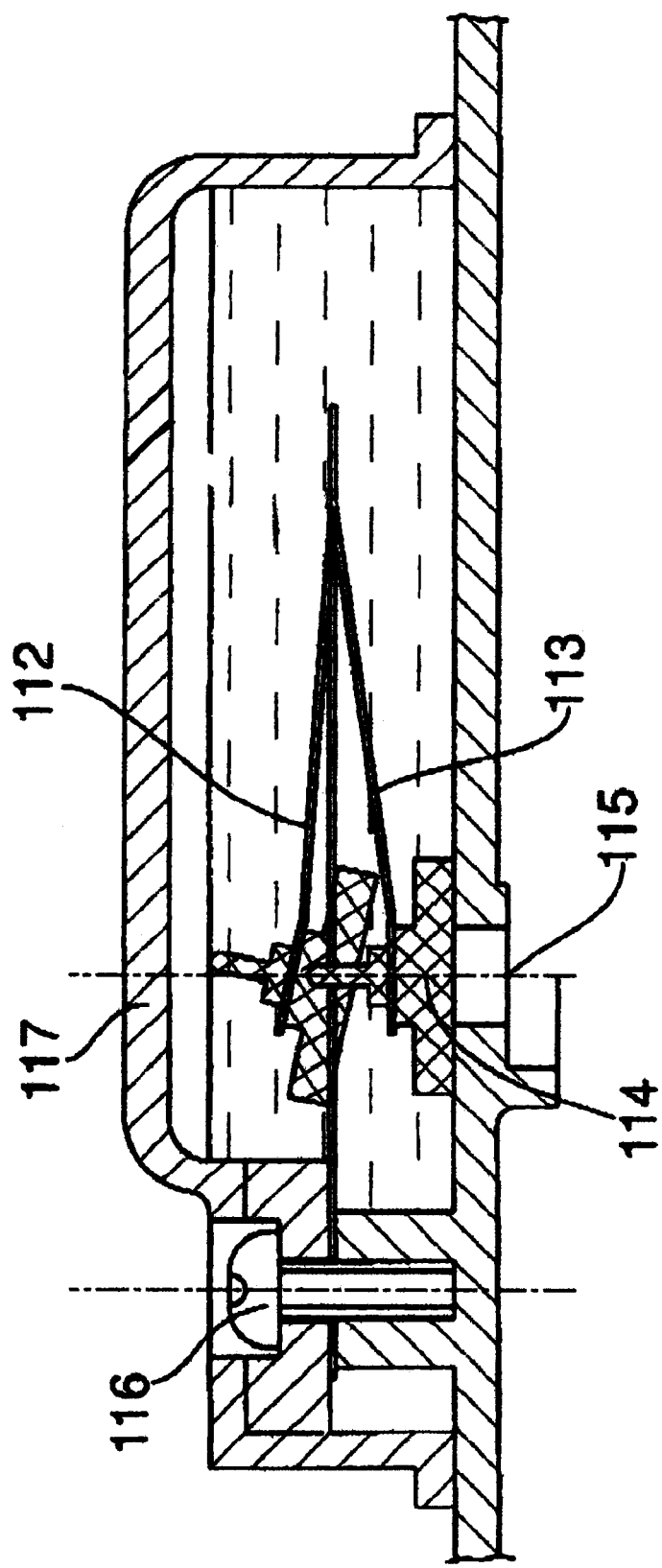
FIG. 4 is a view of the Water Temperature Sensing System.

Referring to FIG. 3, the first embodiment is provided preferably with a water inlet (109) located at the bottom of water tank (102), and a water outlet (110). There is also preferably a drip proof valve (111), which is a portion of a water temperature sensing system as shown in more detail in FIG. 4. The water temperature sensing system permits the recirculation of water through the heating cycle where the water has not yet reached a pre-selected temperature.

The drip proof valve (111) is located in the water tank (102). A heat sensing bi-metal piece (112) is used to detect water temperature. When the water temperature reaches a pre-determined temperature, preferably ninety degrees centigrade or above, the lever (113), which is a part of the bi-metal piece (112), reacts to the pre-determined temperature, stretching upwards and bringing the sealing ring (114) upwards, so that water can pass through the dispensing nozzle (115) to the carafe (105). The water temperature sensing system is affixed preferably using screw bolts (116) and also has a protective covering (117).

Heating tube (118) is preferably formed from aluminum to conduct heat with the desired rapidity. An electric heating element (119) adheres to the heating tube (118), and heats the water drawn through the heater tube (118).

To operate this version of the invention, the hinged lid (104) is raised, and a desired amount of water is introduced into the water tank (102). Preferably, the water level can be observed by a water level indicator (not shown) located on the exterior surface of the housing (101). Beverage making material, usually coffee or tea, is placed in the bottom of the carafe (105). The on/off switch (107) is moved to the "on" position, activating power to the unit.

Water flows into the water inlet (109) and through the inlet tube (103). The water will then pass through the heating tube (118) and be heated by the heating element (119). During the heating process, most or all of the water becomes vaporized. The water vapor and heated water pass through water outlet tube (120) and water outlet (110) back into the water tank (102). The temperature sensing system, including the drip proof valve (111) located in the water tank (102), will sense the water temperature. Should the temperature of the water be below a pre-selected level, preferably ninety degrees centigrade or higher, the valve (111) will not open, and the water will be forced to flow back through the heating tube (118) past the heating element (119) and repeat the heating cycle until the water in the water tank (102) reaches the desired temperature. When the temperature reaches a pre-selected level, preferably 90 degrees centigrade or above, the drip proof valve (111) will open, allowing the heated water to pass to the dispensing nozzle (115), and into the carafe (105) through either holes in the carafe lid (121), or through the lip portion of the carafe (122).

The carafe (105) has a lid (121), preferably dome-shaped, through which a plunger (123) that has an upper end with a knob (124) attached for manual raising and depressing of the plunger (123). The housing (101) is also adapted to provide clearance to raise and lower the plunger (123). The lower end of the plunger (123) has a strainer (125) that is attached to the plunger (123) so that raising and depressing the plunger (123) also raises and depresses the strainer (125).

When the carafe (105) receives a desired amount of heated water, the heated water remains in the carafe (105) during the steeping period with the beverage making material. This steeping period is preferably about 8 to 10 minutes. After the steeping cycle is completed, the plunger (123) is manually raised and depressed slowly until the strainer (125) reaches the bottom of the carafe (105) and the beverage making material is compacted beneath the strainer (125), thereby separating the infused beverage from the beverage making material. This raising and depressing of the plunger (123) is repeated several times for proper beverage extraction.

Second Preferred Embodiment

Figure 5:
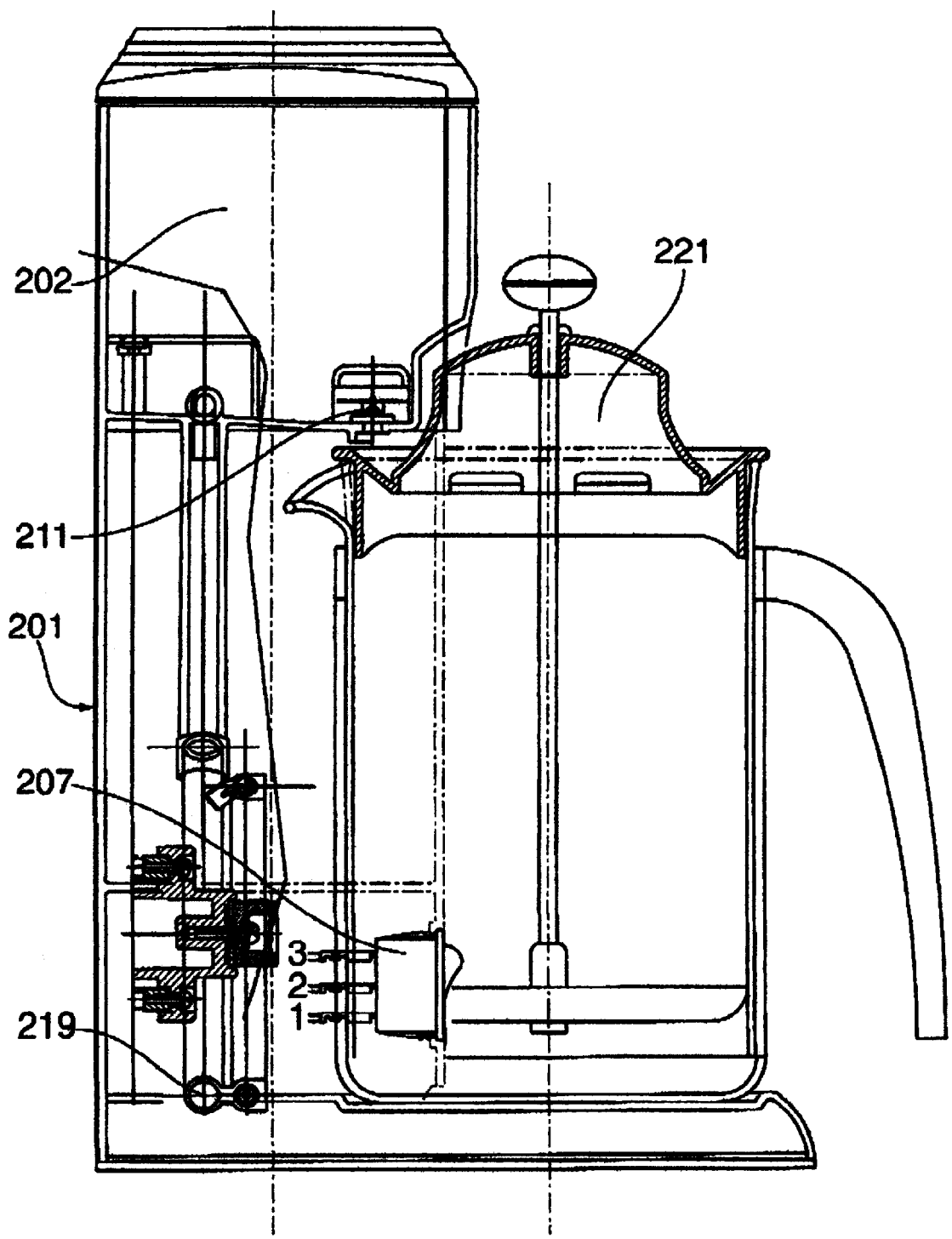
FIG. 5 is a side plan view of the second preferred embodiment.
Figure 6:
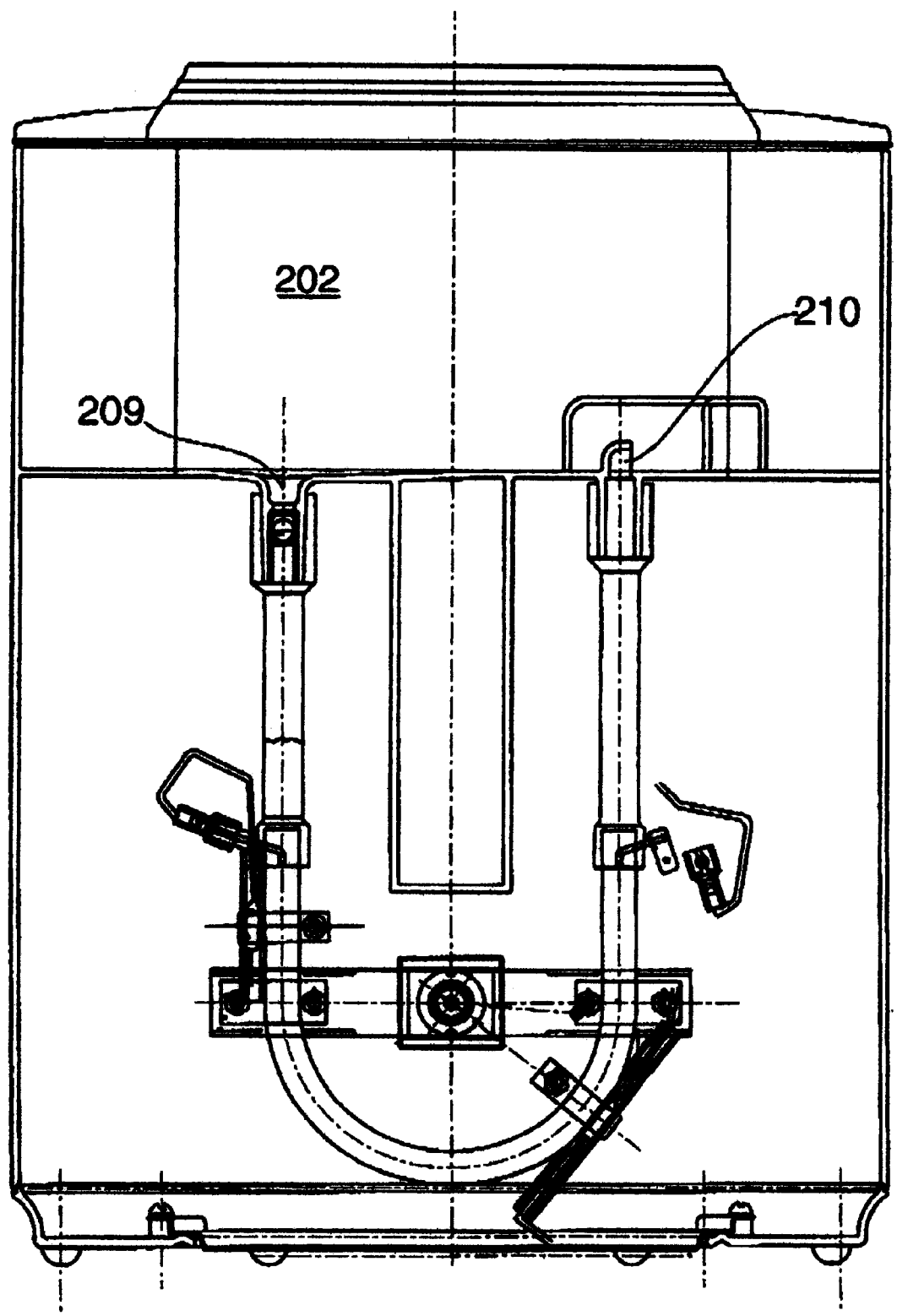
FIG. 6 is a rear plan view of the second preferred embodiment.

Referring now to the drawings, FIG. 5 illustrates a second preferred embodiment of the invention. This embodiment of the invention is preferably adapted for brewing larger amounts of an infused beverage, for example, thirty-two to forty-eight fluid ounces of coffee or tea. FIG. 5 shows the water tank (202) located in the upper portion of the housing (201). The heating element (219) is preferably located towards the bottom of the housing (201), and is disposed upright relative to the bottom of the housing. This is indicated in more detail in FIG. 6, which shows a rear plan view of the second embodiment.

Figure 7:
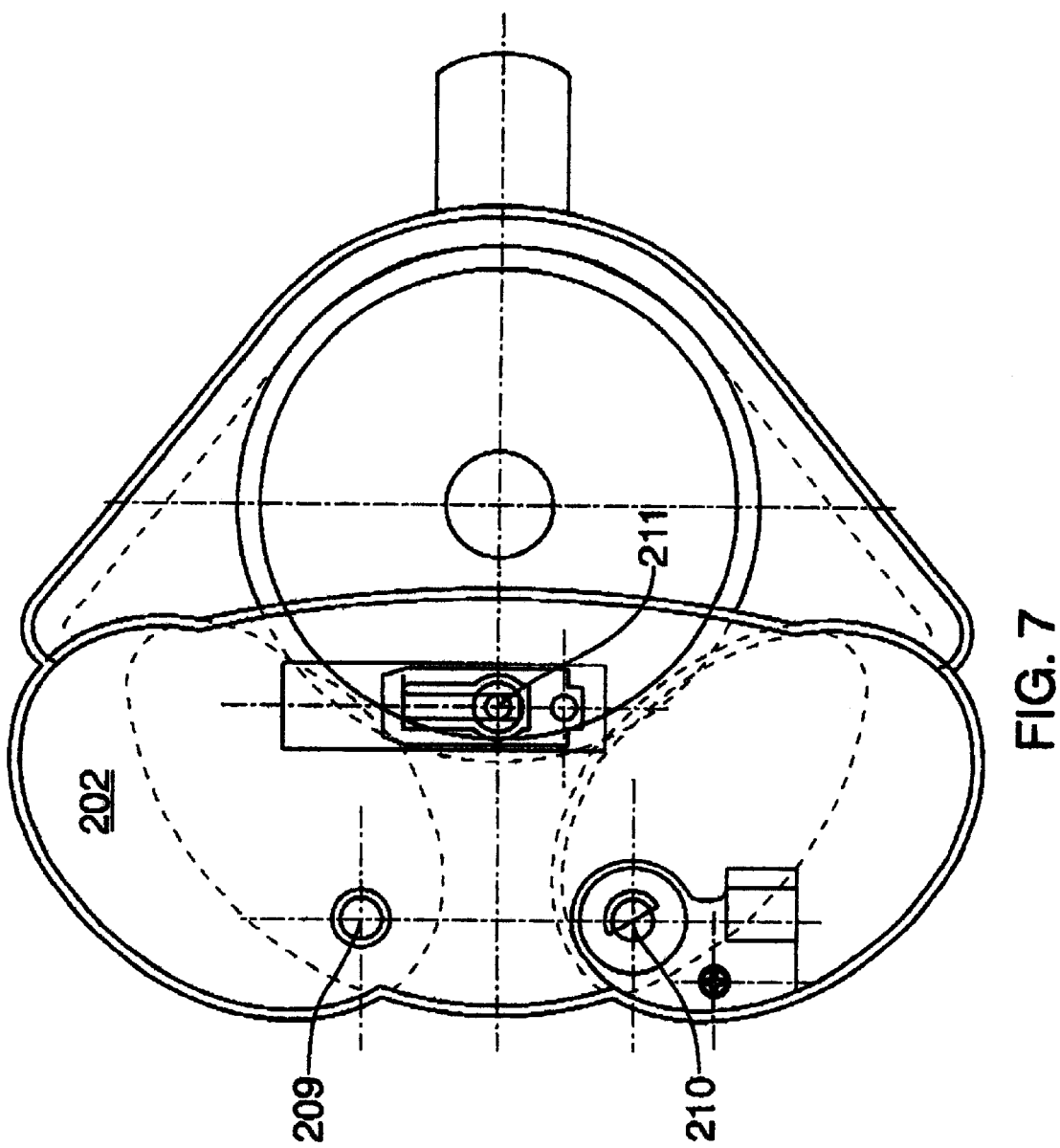
FIG. 7 is a top plan view of the second preferred embodiment.

FIG. 7 shows a top plan view of the second embodiment, which is similar to the first embodiment shown in FIG. 3.

Third Preferred Embodiment

Figure 8:
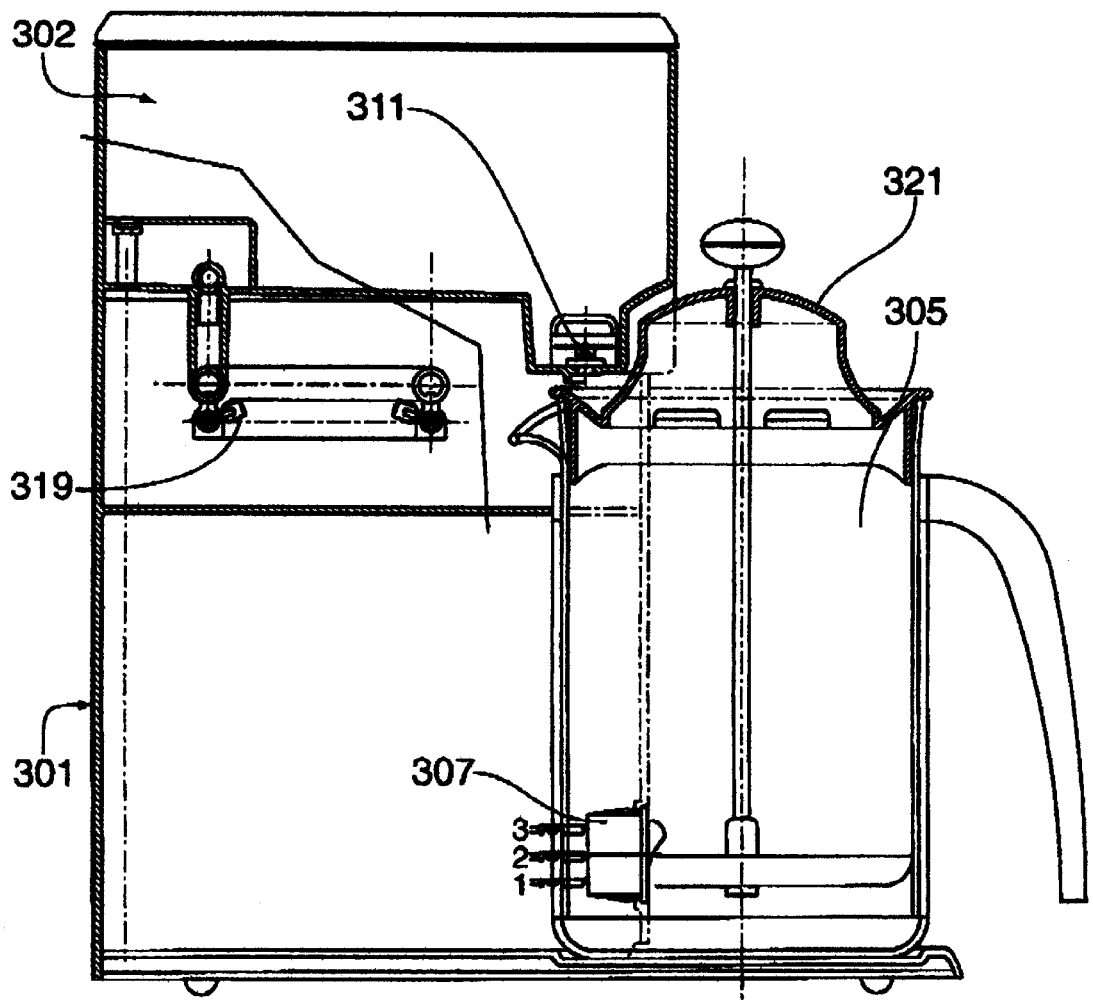
FIG. 8 is a side plan view of the third preferred embodiment.
Figure 10:
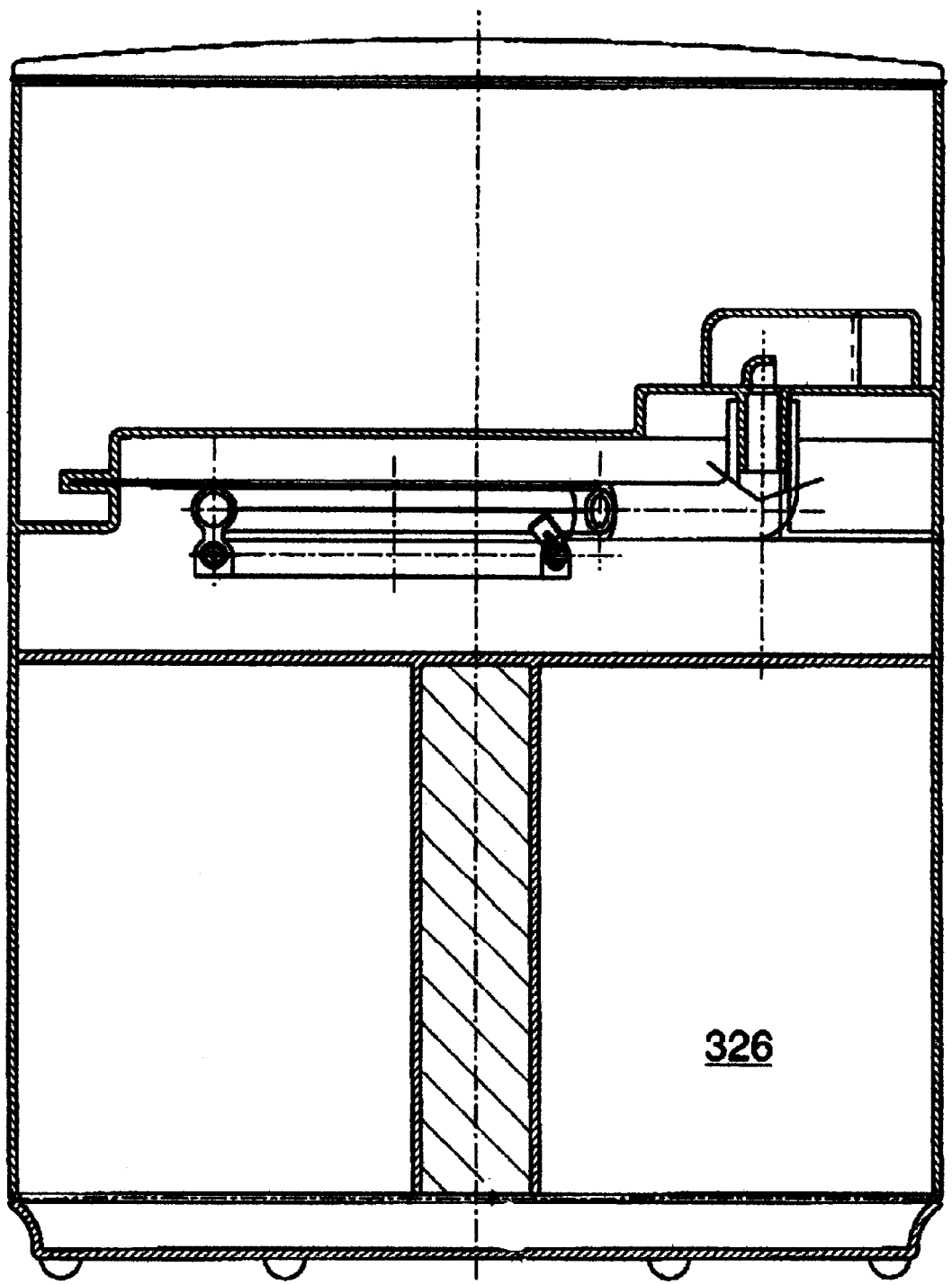
FIG. 10 is a rear plan view of the third preferred embodiment.

Referring now to the drawings, FIG. 8 illustrates a third preferred embodiment of the invention. This embodiment of the invention is preferably adapted for brewing larger amounts of an infused beverage, for example, thirty-two to forty-eight fluid ounces of coffee or tea. FIG. 8 shows the water tank (302) located in the upper portion of the housing (301). The heating element (319) is preferably located beneath the water tank (302), and is disposed horizontally relative to the bottom of the housing. This is indicated in more detail in FIG. 10, which shows a rear plan view of the third embodiment. Also shown in the third embodiment is a compartment (326) for storage of the power cord.

Figure 9:
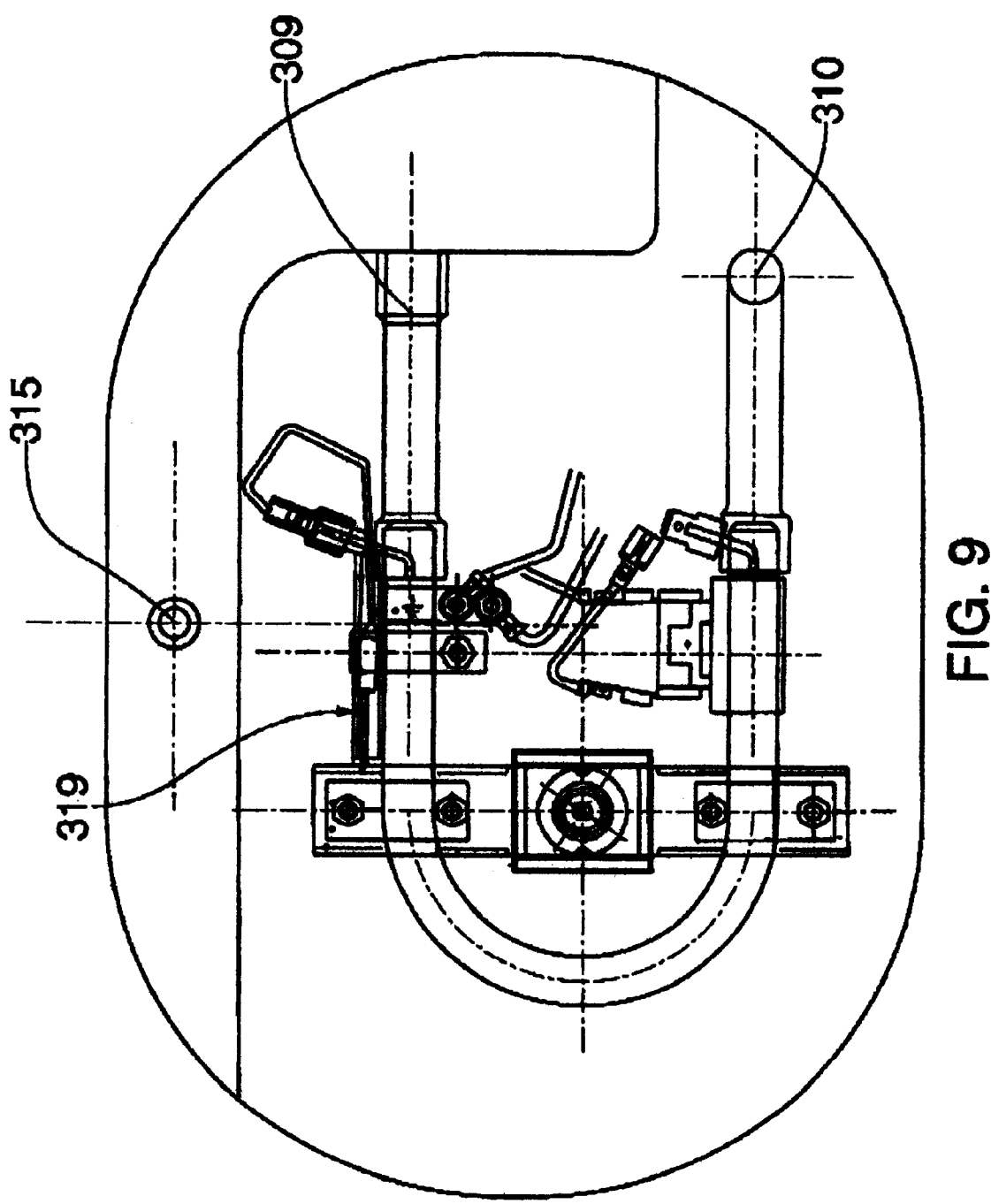
FIG. 9 is a top plan view of the heating element distribution for the third preferred embodiment.

FIG. 9 shows a top plan view of the heating element arrangement of the third embodiment.

Fourth Preferred Embodiment

Figure 11:
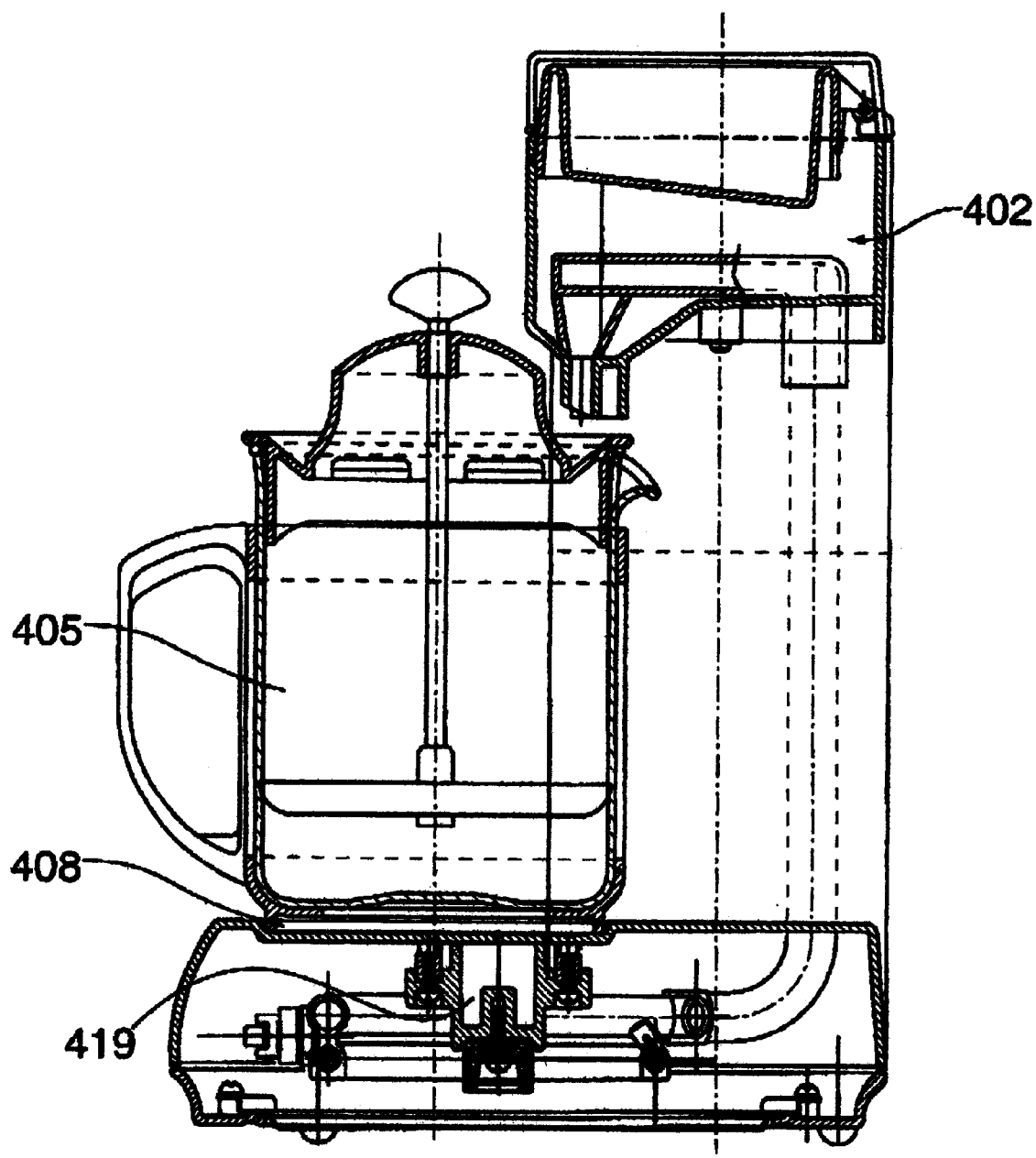
FIG. 11 is a side plan view of the fourth preferred embodiment.
Figure 13:
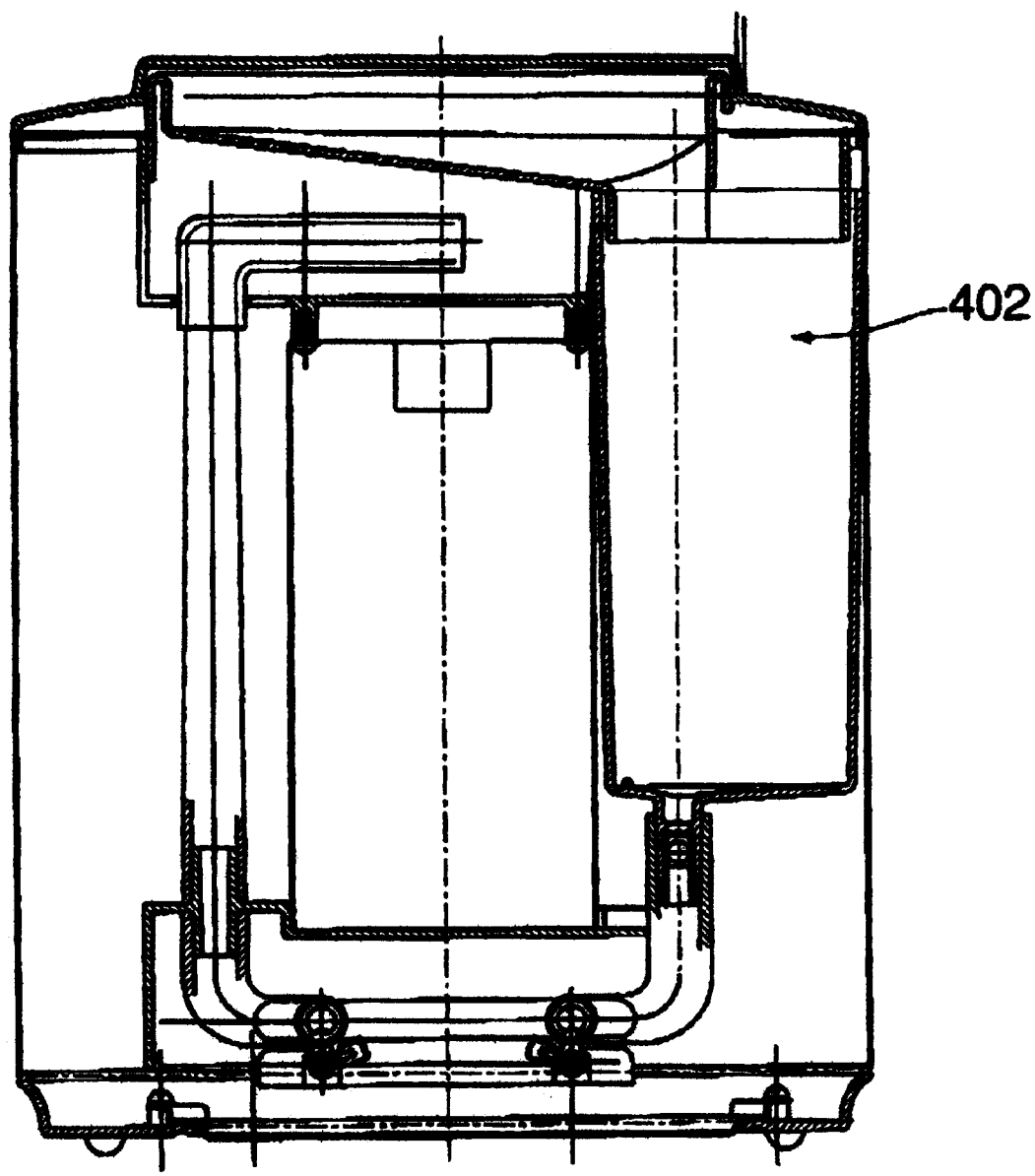
FIG. 13 is a rear plan view of the fourth preferred embodiment.

Referring now to the drawings, FIG. 11 illustrates a fourth preferred embodiment of the invention. This embodiment of the invention is preferably adapted for brewing smaller amounts of an infused beverage, for example, sixteen fluid ounces or less of coffee or tea. FIG. 11 shows the water tank (402) located in the right side portion of the housing (401). The heating element (419) is preferably located beneath the plate (408) upon which the carafe (405) is seated. This is indicated in more detail in FIG. 13, which shows a rear plan view of the fourth embodiment.

Figure 12:
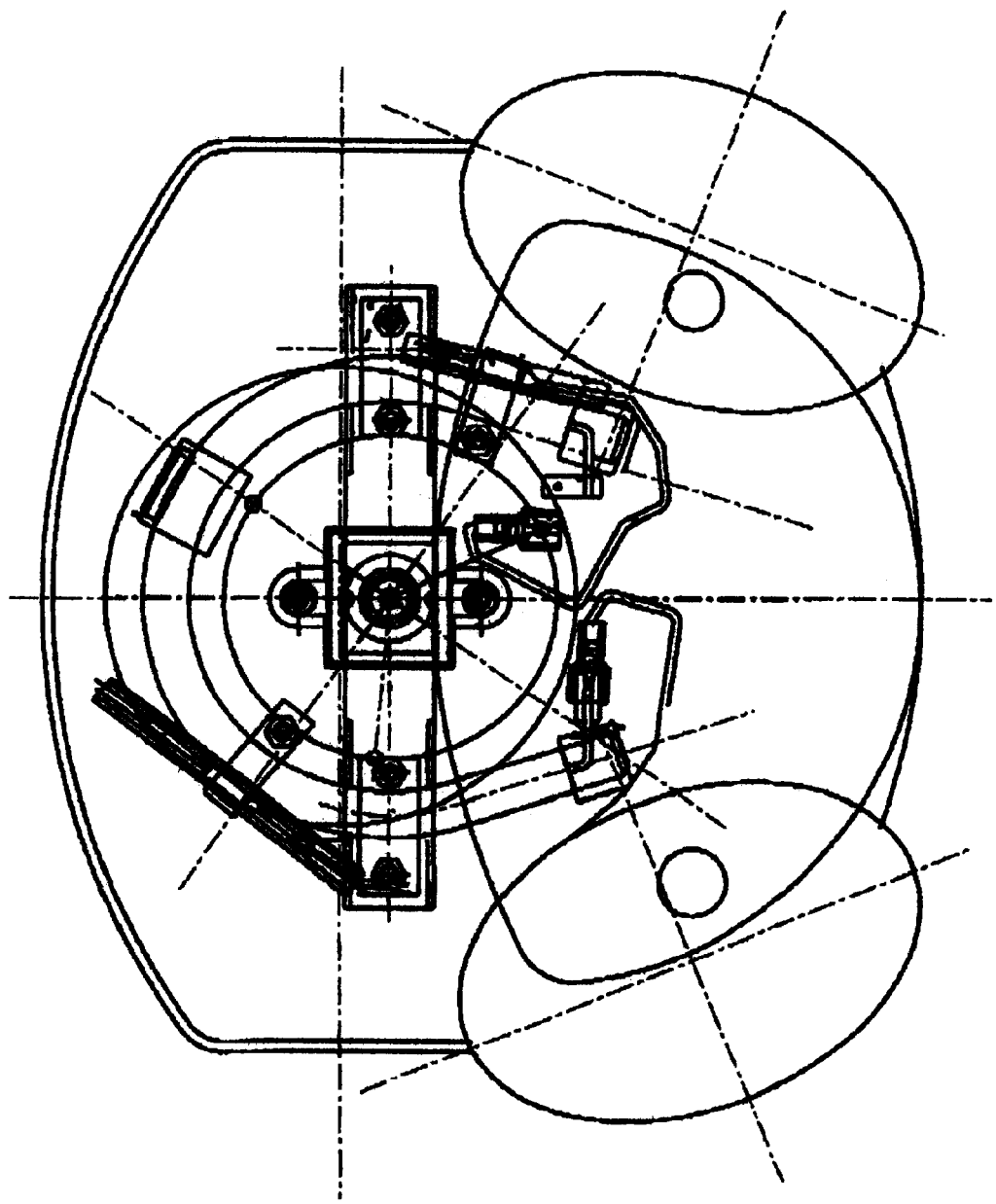
FIG. 12 is a top plan view of the fourth preferred embodiment.

FIG. 12 shows a top plan view of the fourth preferred embodiment. The fourth embodiment of the invention does not employ a heat sensing system as used in the first three embodiments, but rather employs a conventional water heating and dispensing unit as is known in the prior art. The fourth embodiment, therefore, would heat the water up to about eighty-five degrees centigrade, rather than the ninety degrees of the previously disclosed embodiments.

While there have been described above the principles of this invention in connection with specific apparatus, it is to be clearly understood that this description is made only by way of example and not as a limitation to the scope of the invention.

What is claimed is:

1. A beverage making machine comprising:

a housing;

the housing carrying a water tank for holding water to be heated to a desired temperature;

a heating tube within the housing and in fluid communication with the water tank;

the heating tube in fluid communication with a water heater;

a hot water dispenser in fluid communication with the water heater;

a carafe arranged below the hot water dispenser so that heated water is dispensed from the hot water dispenser into the carafe;

the carafe having a plunger;

the plunger cooperating with a strainer within the carafe, where the plunger and strainer are arranged for manually and substantially separating an infused beverage from beverage making material.

2. A beverage making machine according to claim 1, wherein the desired temperature of the water to be heated is at least 90° C.

3. A beverage making machine according to claim 1, the heating tube being made of material selected from the group consisting of aluminum, aluminum alloy and a material having similar heat transmitting properties to aluminum.

4. A beverage making machine according to claim 1, further comprising:

a temperature sensor operably engaged with a valve;

the valve being opened where a pre-selected temperature is sensed by the temperature sensor;

the valve remaining closed where the pre-selected temperature is not reached, allowing liquid to pass through a heating tube to be heated until the pre-selected temperature is reached.

5. A beverage making machine according to claim 4, the heating tube being made of material selected from the group consisting of aluminum, aluminum alloy and a material having similar heat transmitting properties to aluminum.

6. A beverage making machine according to claim 4, where the temperature sensing system comprises a bi-metal piece for sensing temperature and operably engaging a valve.

7. A beverage making machine according to claim 4, wherein the pre-selected temperature is at least 90° C.

* * * * *